United States Patent [19]
Emmert et al.

[11] Patent Number: 5,151,643
[45] Date of Patent: Sep. 29, 1992

[54] INTEGRAL HANG-UP AND BATTERY CHARGING APPARATUS

[75] Inventors: Steven C. Emmert, Arlington Heights; Carlson, Kenneth W., Hawthorn Woods; Louis J. Lundell, Buffalo Grove; Nicholas Mischenko, Mt. Prospect; Terrance N. Taylor, Barrington; Albert L. Nagele, Wilmette, all of Ill.

[73] Assignee: Motorola, Inc., Schaumburg, Ill.

[21] Appl. No.: 664,145

[22] Filed: Mar. 4, 1991

[51] Int. Cl.⁵ .......................... H01M 10/16
[52] U.S. Cl. ........................ 320/2; 379/61; 455/90
[58] Field of Search ........ 320/2; 455/32, 34, 73, 455/78, 79, 89, 90, 127, 343, 347; 379/61-63, 413

[56] References Cited

U.S. PATENT DOCUMENTS

| | | | |
|---|---|---|---|
| 4,225,814 | 9/1980 | Gantz et al. | 320/2 |
| 4,458,111 | 7/1984 | Sugihara | 379/61 |
| 4,511,761 | 4/1985 | Yamazaki et al. | 455/73 X |
| 4,634,810 | 1/1987 | Grassl et al. | 379/61 |
| 4,706,274 | 11/1987 | Baker et al. | 379/61 |
| 4,731,813 | 3/1988 | Schroeder | 379/62 |
| 4,881,259 | 11/1989 | Scordato | 379/61 X |
| 5,020,094 | 5/1991 | Rash et al. | 379/61 X |
| 5,046,131 | 9/1991 | Takanashi et al. | 455/90 |

FOREIGN PATENT DOCUMENTS 0044924 2/1990 Japan .................. 455/127

OTHER PUBLICATIONS

A user manual for Panasonic, Inc., cordless phone, model number KX-T3725, no date available, pp. 14 and 15.
A portion of a user manual for a Uniden, Inc., cordless telephone, no date available, pp. 7 and 8.
A portion of a user manual for AT&T, Inc., cordless telephone model number 5500, 1988, p. 4.
A portion of a user manual for Southwestern Bell Telecommunication, Inc., cordless phone, model number FF-1700, no date available, pp. 6 and 7.
A portion of a user manual for a Sony cordless telephone model number SP-110/150, 1987, pp. 9-10.

Primary Examiner—William H. Beha, Jr.
Assistant Examiner—Kristine Peckman
Attorney, Agent, or Firm—Kevin D. Kaschke; Raymond A. Jenski; John A. Fisher

[57] ABSTRACT

A charging apparatus for a multiunit system includes a portable unit (101) and a base unit (103). The portable unit (101) includes first and second conductive contacts (119, 120) disposed on the portable unit (101) essentially opposite each other, and rechargable energy storage means (311) electrically coupled to the first and second conductive contacts (119, 120). The base unit (103) includes an indentation (124) formed in the base unit (103) and having a receiving surface shaped to receive at least a portion of the portable unit (101), first and second conductive protrusions (127, 129) extending outwardly beyond the receiving surface essentially opposite each other, and energy source means (131) electrically coupled to the first and second conductive protrusions (127, 129). The first and second conductive protrusions (127, 129) contact the first and a second conductive contacts (119, 120), respectively when at least a portion of the portable unit (101) is placed in the indentation (124).

32 Claims, 3 Drawing Sheets

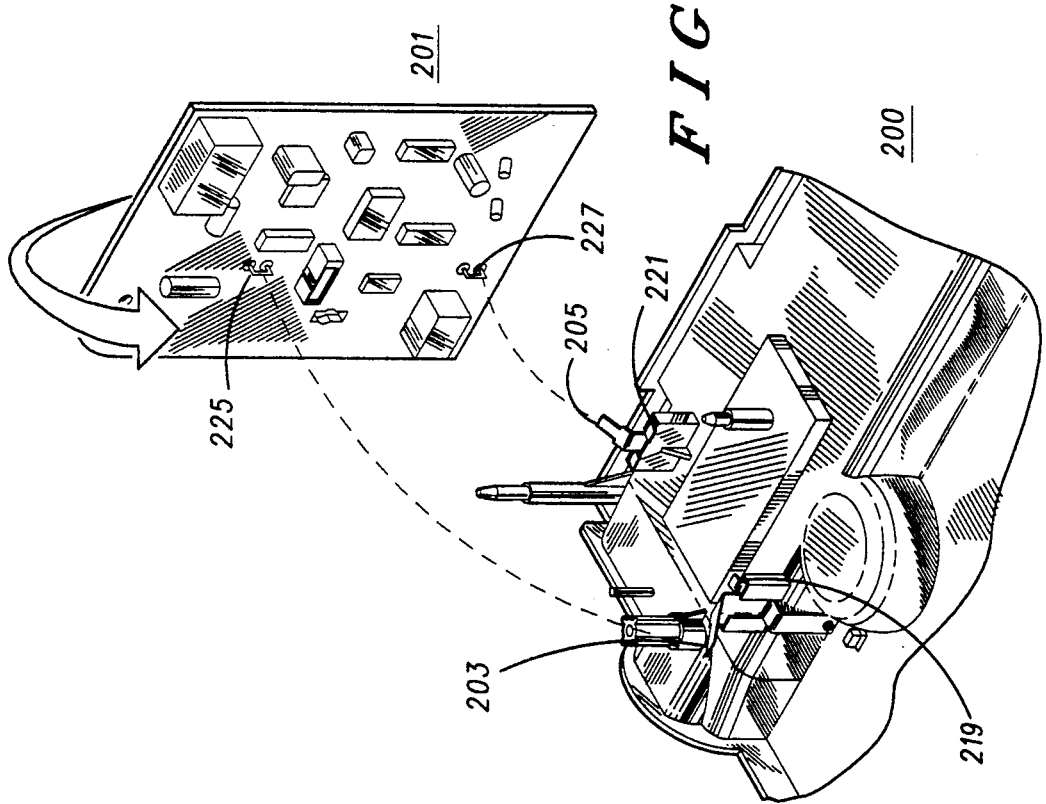
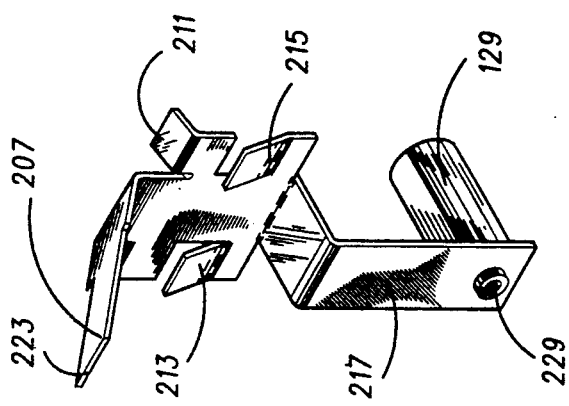

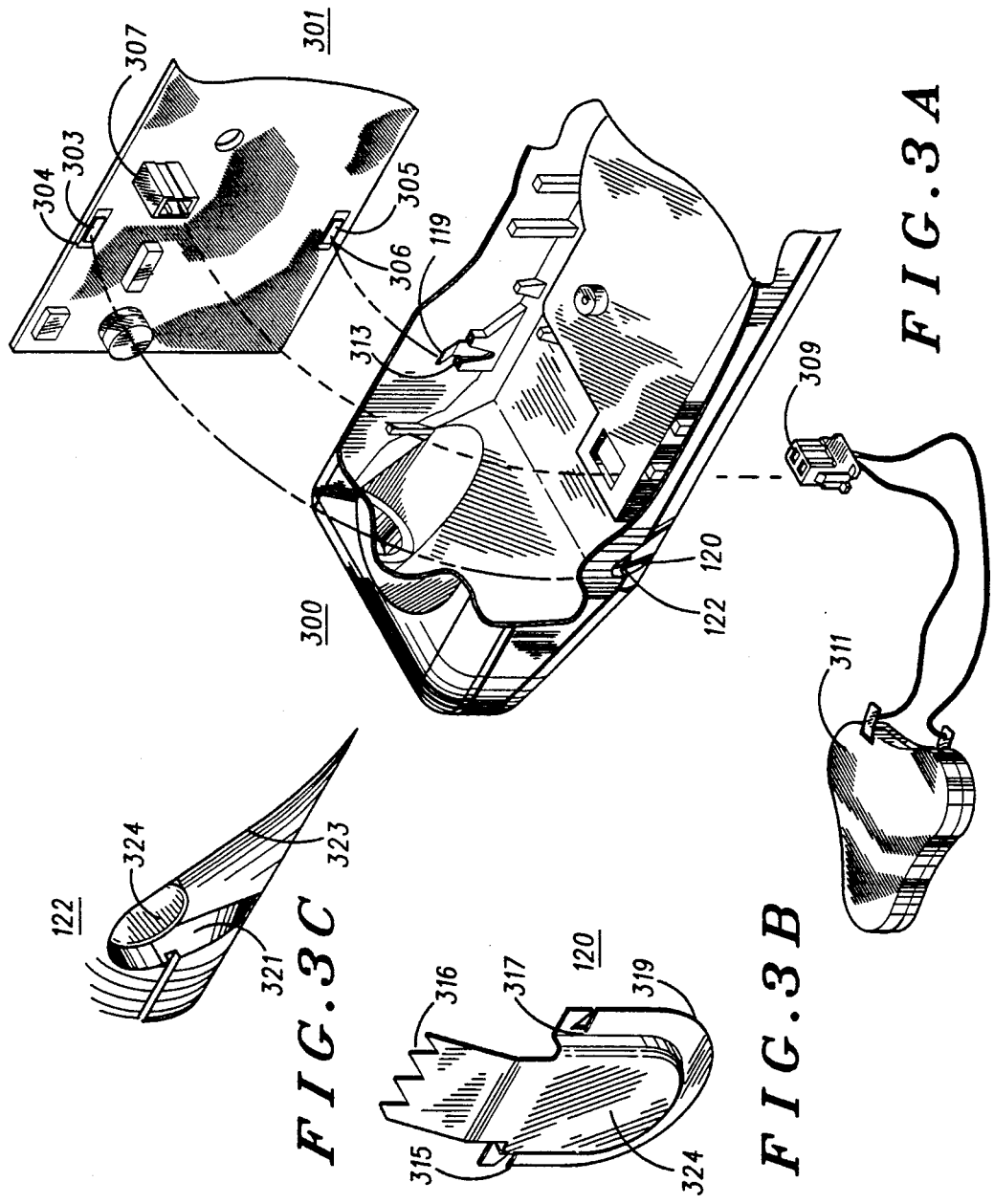

INTEGRAL HANG-UP AND BATTERY CHARGING APPARATUS

FIELD OF THE INVENTION

This invention relates generally to a hang-up apparatus and a battery charging apparatus and more particularly to a novel integral hang-up and battery charging apparatus for cordless radiotelephones.

BACKGROUND OF THE INVENTION

Cordless radiotelephones typically include a base station and a handset. The base station comprises of a transformer, an RJ11 phone jack, an antenna, hang-up mechanism and battery charging pads. The transformer converts 110 V AC, provided by a wall outlet, to 12 V DC thereby supplying power to the base station. The RJ11 phone jack is connected to a conventional wall mount connector which couples telephone signals between the base station and a public switched telephone network. The antenna enables wireless RF communication between the base station and the handset. The battery charging pads interface with corresponding contacts on the handset allowing the handset's battery to be recharged using power from the base station when the handset is stored on the base station.

When the handset battery is sufficiently charged, the handset may be removed from the base station and taken to a remote site. The remote handset may place or receive telephone calls by coupling an RF signal between the base station antenna and an antenna on the handset.

Hang-up mechanisms have been devised which secure the handset to the base station and align the battery charging contacts on the handset to the battery charging pads on the base station. It is desirable that the hang-up mechanism be useful when the base station is mounted in both a horizontal and vertical configuration. A hang-up mechanism used by Panasonic Inc. on cordless telephone model number KX-T3725 uses a convertible separate piece part which has two positions. In the first position, the piece part is attached to the base station for the horizontal mounting configuration. To use the base station in a vertical mounted configuration, the piece part is detached from the base station, rotated 180°, and reattached to the base station. In the second position, the piece part reveals a protrusion which secures the handset to the base in the vertical mounted configuration. A disadvantage of Panasonic's two position piece part is that if the piece part is lost, the handset cannot be secured to the base station in a vertical mounted configuration.

A mounting mechanism used by Uniden Inc. on model number XE-250 uses a permanent protrusion molded into the base station which interlocks with a corresponding recess in the handset. Although the protrusion cannot be lost, the range of motion to hang up the handset in a horizontal mount configuration is very limited.

A hang-up mechanism for a cordless telephone model number HT-5500 by AT&T Inc. uses a recessed impression in the base unit corresponding to the profile of the handset thereby aligning the handset charging contacts to the battery charging pads in the base station. The disadvantage of this hang-up mechanism is that the base station cannot be used in a vertical mounting configuration.

The three aforementioned examples of hang-up mechanisms by Panasonic Inc., Uniden Inc. and AT&T Inc. use a conventional connection between the battery charging pads on the base station and battery charging contacts on the handset. The battery charging contacts on the handset comprise of two essentially flat stationary pads disposed within the same surface. The battery charging pads in the base station comprise two conductive spring loaded pads protruding from the same surface. When the handset is positioned in the base unit, the battery charging pads in the base station mate with corresponding battery charging contacts on the handset thereby providing power from the base station to recharge the battery in the handset. The battery charging pads in the base station are retractable and provide sufficient pressure for an electrical connection and overcome any tolerance gap between the handset's battery charging contacts and the base station's battery charging pads. The handset's battery charging contacts typically retract the battery charging posts in the base station as a result of the weight of the handset.

A different battery charging system is used by Sony Inc. model number SPP-110. Two batteries are provided with the system, one battery may be placed on the base station for recharging while the second battery is in use with the handset. The battery within the handset cannot be recharged when the handset is stored on the base station. A spent battery is replaced with a fully charged battery from the base station and the spent battery is recharged by the base station. This interchangeable battery pack concept is inconvenient for the user of the radiotelephone if one battery pack is lost. The handset may be used only when the one available battery has been charged.

A cordless telephone sold by Southwestern Bell Telecommunications Inc. model number FF-1700 (Freedom Phone), has integrated the hang-up mechanism with the battery charging pads. The radiotelephone comprises two conductive hooked protrusions extending from the same surface in the handset which couple to two conductive spring loaded pads disposed in the same surface in the base station. When the handset is hung-up in the base station, the two conductive hooked protrusions deflect corresponding conductive pads in the base station thereby causing an interlocking hang-up and battery charging mechanism. Although the radiotelephone's integrated hang-up and battery charging mechanism seems to be a good idea at first glance, using the product is very cumbersome. Once the handset is secured to the base station, it can only be removed by applying a strong force in a particular direction. The release operation is so cumbersome that the manufacturer included special instructions in their user manual describing the procedure for removing the handset from the base station. Normally, this operation is so simple the user needs no instructions.

Therefore, a formidable challenge is to integrate the hang-up and battery charging mechanisms whereby the handset may be coupled to the base station over a wide range of motion in both a horizontal and vertical mounting configuration.

SUMMARY OF THE INVENTION

A charging apparatus for a multiunit system includes a portable unit and a base unit. The portable unit includes first and second conductive contacts disposed on the portable unit essentially opposite each other, and rechargable energy storage means electrically coupled to the first and second conductive contacts. The base unit includes an indentation formed in the base housing and having a receiving surface shaped to receive at least a portion of the portable unit, first and second conductive protrusions extending outwardly beyond the receiving surface essentially opposite each other, and energy source means electrically coupled to the first and second conductive protrusions. The first and second conductive protrusions contact the first and second conductive contacts, respectively, when at least a portion of the portable unit is placed in the indentation.

BRIEF DESCRIPTION OF THE DRAWINGS

FIG. 2a is an isometric drawing of a portion of the inside of the base station of FIG. 1.

FIG. 2b is an isometric drawing of a metal part attached to the portion of the base station of FIG. 2a.

FIG. 3a is an isometric drawing of a portion of the inside of the handset of FIG. 1.

FIG. 3b is an isometric drawing of a contact attached to a portion of the inside of the handset of FIG. 1.

FIG. 3c is an isometric drawing of the triangular recess shown on the handset housing portion of FIG. 3a.

DETAILED DESCRIPTION OF THE PREFERRED EMBODIMENT

Figure 1:
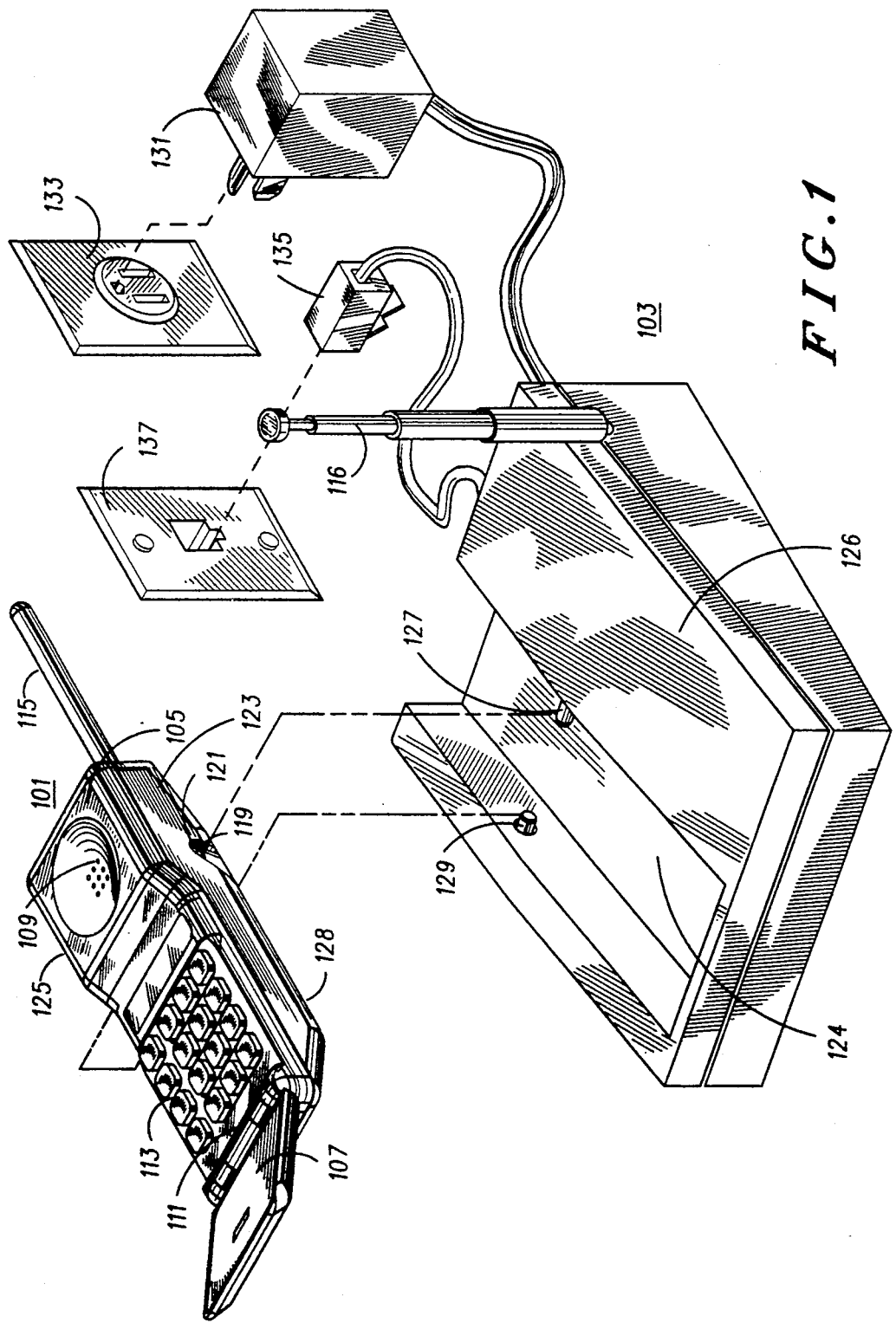
FIG. 1 is an isometric drawing of a cordless radiotelephone system including a handset and a base station constructed in accordance with the present invention.

A cordless radiotelephone system comprising a handset 101 and a base station 103 is shown in FIG. 1. The illustrated handset 101 consists of two external portions, a body portion 105 and a flip element 107. The drawing of FIG. 1 shows the flip element 107 in an "open" position such that the user of the handset may listen via earpiece 109 and may speak into a microphone 111. A telephone dial, or keypad, 113 consists of a plurality of buttons numbered one through zero, # and * in a familiar telephone arrangement. The keypad 113 also has additional function buttons such as channel select, volume control and other buttons associated with telephone number recall. Wireless RF communication is provided between the base station antenna 116 and the handset antenna 115.

Since the cordless handset 101 of FIG. 1 is indeed portable, some source of electrical energy is necessary to power the electrical functions of this cordless handset. The source of this electrical energy is a battery (not shown), recessed in the back side of the body portion 105, typically implemented as a rechargeable electrochemical cell or cells. It is expected that the user will be able to recharge the battery while the handset 101 is stored on the base station 103.

The preferred embodiment of the present invention utilizes a novel integrated hang-up and battery charging mechanism as shown in FIG. 1. A battery charging contact 119 is disposed within a triangular recess 121 on side 123 of the body portion 105 of the handset 101. A similar battery charging contact 120 is disposed within a similar triangular recess 122 on side 125 in a location essentially parallel and opposite to the battery charging contact and recess on side 123. Each battery charging contact 119 and 120 provides a conductive electrical connection to the rechargeable battery within the handset 101. In the preferred embodiment, the battery charging contacts are made of nickel plated beryllium copper.

When the handset 101 is stored in an indentation 124 in an external surface 126 of the base station 103, battery charging posts 127 and 129 are disposed within the triangular recesses on the handset 121 and 122, respectively, thereby creating a mechanical interference which provides an electrical connection to the battery charging contacts on the handset 119 and 120, respectively. The battery charging posts 127 and 129 wipe across the battery charging contacts which is beneficial in breaking through any minor contamination of the contact surface. In the preferred embodiment, the battery charging posts are made of nickel plated 1040 steel. The battery charging posts 127 and 129 are spring loaded enabling them to retract away form each other when the handset is positioned on the base station 103 and protrude forward when the handset 101 is removed from the base station.

In the preferred embodiment, the battery charging posts are 53.2 mm apart between the tips of the posts and the width between the surface of the battery charging contacts on the handset are 55.2 mm apart. Thus, when the handset is stored in the base station, the battery charging posts are displaced 2.0 mm away from each other. The displacement results in an axial spring force of about 100 grams per battery charging post.

In the preferred embodiment, the battery charging posts have a diameter of 4.25 mm and an edge radius of 1.0 mm. The battery charging posts 127 and 129 are conductive thereby enabling a transfer of electrical energy from the base station 103 to the battery charging contacts on the handset 101 for recharging the handset battery. Alternate embodiments may employ conductive protrusions of any shape to accomplish essentially the same task.

The present invention may be employed in such a cordless radiotelephone as well as in other electronic equipment needing a hang-up and/or battery charging mechanism. The present invention is different form the aforementioned background references in that the base station's battery charging posts described in the preferred embodiment are not disposed in the same surface. Likewise, the handset's battery charging contacts described in the preferred embodiment differ from the aforementioned background references in that the preferred embodiment's battery charging contacts are not disposed on the same surface. Rather, each battery charging post on the base station protrudes from essentially parallel and opposite surfaces of the base station and battery charging contacts on the handset are respectively disposed on essentially parallel and opposite surfaces on the handset.

The base station 103 receives its electrical energy from the transformer 131 which converts 110 V AC from a wall outlet to 12 V DC for the base station 103. The 12 V DC input to the base station 103 provides energy to the battery charging post 127 through a current limiting resistor (not shown). Battery charging contact 129 is coupled to electrical ground through another current limiting resistor (not shown). A conventional RJ11 phone jack 135 couples telephone signals from the conventional public switched telephone network through a phone jack outlet 137 to the base station 103.

The triangular shaped recess disposed on each side 123 and 125 of the handset 101 provides a wide range of motion in which the handset may be hung up or removed from the base station 103. One side of each recess 121 and 122 is open to the back side 128 of the body portion of the handset 105 providing an entrance and exit area for the battery charging posts 127 and 129, respectively. The wide range of motion enhances user accessibility to the handset 101 in both horizontal and vertical mounting configurations. The exact range is discussed with FIG. 3c.

A portion of the inside of the base station 103 is shown in FIG. 2a. A detailed isometric view of a metal part positioning the battery charging posts is shown in FIG. 2b. The conventional mechanism illustrated couples an electrical charge from the printed circuit board (pcb) 201 to the battery charging post 127 and 129 via metal parts 203 and 205, respectively. In the preferred embodiment of the present invention, each metal part 203 and 205 is stamped and formed from a sheet of stainless steel 0.3 mm thick. The stamping and forming process creates a pliable portion 207, two tabs 211 (second tab not shown), two barbs 213 and 215 and a spring portion 217. Each metal part 203 and 205 is inserted into slots 219 and 221, respectively, which are molded into the base station's housing. The metal parts 203 and 205 are secured within the slot using barbs 213 and 215 which create an interference with the inside of the slot. Two tabs 211 (second tab opposite pliable portion 207 not shown) interface with the top of the slot when the metal parts are properly located. The pliable portion 207 of each metal part includes a straight edge 223 which contacts a conductive staple 225 or 227 on the pcb 201. The conductive staples 225 and 227 are soldered to the pcb 201 using a conventional waveline soldering process. The metal parts also include a spring portion 217 connected to the battery charging post 129 using a rivet 229.

Once the metal parts 203 and 205 are secured within the slots 219 and 221, respectively, in the base station's housing 200, the battery charging posts 127 and 129 are free to retract away from each other using the spring portion 217. The battery charging posts 127 and 129 are disposed within the indentation 124 essentially opposite each other along essentially the same axis. Thus, an effective electrical connection with the charging contacts on the handset 101 is achieved.

The pcb 201 is secured to the housing 200 using pressure from a second base station housing portion (not shown) such that the pliable portion 207 of the formed metal parts 203 and 205 deflect when they contact the conductive staples 225 and 227 thereby creating a reliable electrical connection. The aforementioned two current limiting resistors (not shown) soldered to the pcb 201 comprise a typical battery charging circuit which provides a 12 V DC open circuit, constant current source to the conductive staples 225 and 227 coupled to the battery charging posts 129 and 127, respectively, via metal parts 203 and 205, respectively.

FIG. 3a illustrates the inside of a portion of the handset 101 shown in FIG. 1. FIG. 3b illustrates an isometric view of the battery charging contact 120 removed from the handset housing. In a similar manner to the base station assembly technique, the handset pcb 301 is secured to the handset housing 300 such that a conductive handset pad 303 on the pcb 301 contacts the saw tooth edge 316 of battery charging contact 120 thereby providing a reliable electrical connection from the charging contacts to the pcb 301. Contact 119 is coupled to the pcb 301 in essentially the same manner. Each conductive handset pad 303 and 305 on the pcb comprises a nickel plated steel pad approximately 0.25 mm thick which is reflow soldered to the pcb on solder pads 304 and 306, respectively. The nickel plating inhibits oxidation of the underlying metal thereby providing a reliable surface contact.

The pcb 301 also includes a male connector 307 which couples the electrical energy from conductive handset pads 303 and 305 to a mating female connector 309 attached to the battery 311. Thus, when the handset 101 is hung-up in the base station 103, the battery 311 is recharged by coupling the electrical energy from the charging contacts 120 and 119 through corresponding conducting pads 303 and 305, respectively, on the pcb 301 having a male connector 307 coupled to the battery 311.

The charging contact 119 is secured within a slot 313 in the handset housing 300. Charging contact 120 is secured essentially the same way. Barbs 315 and 317 on each charging contact retain the charging contact within the slot. A flange 319 prevents the charging contact from exiting the handset housing 300 through the triangular shaped recess.

FIG. 3c illustrates an isometric view of the triangular recess 122. The second recess 121 has essentially the same shape in a mirror image. After the battery charging contact 120 is positioned within the handset's housing 300, a portion of the battery charging contact 324 is exposed to the outside surface of the housing 300 exposing an area of approximately 8.8 square millimeters. In the preferred embodiment of the present invention, contoured angles of 120° (321) and 35° (323) create the triangular opening in which the battery charging post in the base station 129 may enter or exit the recess 122. The triangular recess is slanted enabling secure handset hang-up in a vertical mounting configuration. In the preferred embodiment, the range of motion allowed for hang-up is 180° since the battery charging posts retract when pressure from the handset is applied. The range of motion for the removal of the handset is about 25° initially then increases to about 55° when the battery charging post is free to exit the opening in the side of the recess.

Although the preferred embodiment of the present invention describes the battery charging contacts on the handset and the retractable battery charging posts in the base station, other embodiments may place the contacts on the base station and the retractable posts in the handset. Similarly, the battery charging posts may be fixed and the battery charging contacts may be fixed. The material used for the contacts and the posts in the preferred embodiment of the present invention may be any suitable conductive material and not limited to the specific aforementioned materials. Additionally, the location of the contacts within their respective surfaces as described in the preferred embodiment do not necessarily need to be opposite each other, lie on essentially parallel surfaces or along the same axis. For example, the contacts may be offset from each other and the planes in which they are disposed may be nonparallel. Likewise is true of the location of the posts. The aforementioned dimensions and shape of the contacts and posts may be changed without departing from the spirit and scope of the present invention. Furthermore, the electrical charge coupled between the base station and the handset need not be limited to a battery charge and may include any electrical signal applied to at least one of the battery charging contacts or posts.

Therefore, an integral hang-up and battery charging mechanism providing a handset with a wide range of accessibility has been disclosed.

What is claimed is:

1. A base unit for charging a rechargeable electrical energy storage medium, the base unit comprising:
   a housing enclosing an electrical energy supply;
   a first side of the housing having an indentation disposed therein, said indentation having at least a first surface and a second surface, whereby the rechargeable electrical energy storage medium may be removably placed at least partially within said indentation;
   first and second conductive protrusions disposed on said first and second surfaces, respectively;
   means for coupling said electrical energy supply to said first and second conductive protrusions, whereby the rechargeable electrical energy storage medium may be charged by said electrical energy supply; and
   means for retracting said first and second conductive protrusions at least partially within said first surface and said second surface, respectively, of said indentation.

2. A base unit in accordance with claim 1 further comprising said first surface essentially opposite and parallel to said second surface.

3. A base unit in accordance with claim 1 wherein said electrical energy storage medium further comprises at least one rechargeable electrochemical cell.

4. A base unit in accordance with claim 1 further comprising a cordless radiotelephone base station.

5. A base unit in accordance with claim 1 wherein said electrical energy storage medium further comprises at least one rechargeable electrochemical cell within a cordless radiotelephone handset.

6. A base unit in accordance with claim 1 wherein said first and second conductive protrusions further comprise first and second conductive battery charging posts, respectively.

7. A base unit in accordance with claim 1 further comprising said first conductive protrusion disposed essentially opposite said second conductive protrusion along a common axis.

8. A base unit in accordance with claim 1 further comprising means for securing the rechargeable electrical energy storage medium to the base unit.

9. A base unit in accordance with claim 8 wherein said means for securing further comprises:
   means for urging said first and second conductive protrusions beyond said first and second surfaces, respectively.

10. A rechargeable electrical energy storage medium charged by a base unit, the base unit having an electrical energy supply coupled to first and second conductive protrusions, the rechargeable electrical energy storage medium comprising:
    a housing enclosing the rechargeable electrical energy storage medium and having at least a first and a second surface;
    first and second conductive contacts disposed on said first and said second surfaces, respectively;
    means for coupling said rechargeable electrical energy storage medium to said first and second conductive contacts, whereby the electrical energy supply may charge said rechargeable electrical energy storage medium when said first and second conductive contacts abut said first and second conductive protrusions; and
    a first and second recess disposed in said first and said second surfaces, respectively, having said first and second conductive contacts disposed therein, respectively.

11. A rechargeable electrical energy storage medium in accordance with claim 10 further comprising said first surface essentially opposite and parallel to said second surface.

12. A rechargeable electrical energy storage medium in accordance with claim 10 further comprising at least one rechargeable electrochemical cell.

13. A rechargeable electrical energy storage medium in accordance with claim 10 further comprising at least one rechargeable electrochemical cell within a cordless radiotelephone handset.

14. A rechargeable electrical energy storage medium in accordance with claim 10 wherein said base unit further comprises a cordless radiotelephone base station.

15. A rechargeable electrical energy storage medium in accordance with claim 10 wherein said first and second conductive contacts further comprise first and second conductive battery charging contacts, respectively.

16. A rechargeable electrical energy storage medium in accordance with claim 10 further comprising said first conductive contact on said first surface disposed essentially opposite and parallel to said second conductive contact on said second surface along a common axis.

17. A rechargeable electrical energy storage medium in accordance with claim 10 further comprising means for retracting said first and second conductive contacts at least partially within said first and second surfaces, respectively.

18. A charging system having a base unit and a rechargeable electrical energy storage medium, the charging system comprising:
    a base unit housing enclosing an electrical energy supply;
    a first side of the base unit housing having a indentation disposed therein, said indentation having at least a first surface and a second surface, whereby the rechargeable electrical energy storage medium may be removably placed at least partially within said indentation;
    first and second conductive protrusions disposed on said first surface and said second surface of said indentation, respectively;
    means for coupling said electrical energy supply to said first and second conductive protrusions;
    means for retracting said first and second conductive protrusions at least partially within said first surface and said second surface, respectively, of said indentation;
    a rechargeable electrical energy storage medium housing enclosing the rechargeable electrical energy storage medium and having at least a first and a second surface;
    first and second conductive contacts disposed on said first surface and said second surface of the rechargeable electrical energy storage medium housing, respectively;
    means for coupling the rechargeable electrical energy storage medium to said first and second conductive contacts;
    a first and a second recess disposed in said first and said second surfaces, respectively, having said first and second conductive contacts disposed therein, respectively; and said first and second conductive protrusions of said base unit housing abutting said first and second conductive contacts of said rechargeable electrical energy storage medium housing, respectively, when the rechargeable electrical energy storage medium is removably placed at least partially within said indentation whereby said electrical energy supply within the base unit may charge the rechargeable electrical energy storage medium within said rechargeable electrical energy storage medium housing.

19. A charging system in accordance with claim 18 further comprising said first surface of said indentation essentially opposite and parallel to said second surface of said indentation.

20. A charging system in accordance with claim 18 wherein the rechargeable electrical energy storage medium further comprises at least one rechargeable electrochemical cell.

21. A charging system in accordance with claim 18 wherein the rechargeable electrical energy storage medium further comprises at least one rechargeable electrochemical cell within a cordless radiotelephone handset.

22. A charging system in accordance with claim 18 wherein said base unit further comprises a cordless radiotelephone base station.

23. A charging system in accordance with claim 18 wherein said first and second conductive contacts further comprise first and second conductive battery charging contacts, respectively.

24. A charging system in accordance with claim 18 wherein said first and second conductive productive protrusions further comprise first and second conductive battery charging posts, respectively.

25. A charging system in accordance with claim 18 further comprising said first conductive contact disposed essentially opposite and parallel to said second conductive contact along a common axis.

26. A charging system in accordance with claim 18 further comprising said first conductive protrusion disposed essentially opposite and parallel said second conductive protrusion along a common axis.

27. A charging system in accordance with claim 18 further comprising means for retracting said first and second conductive contacts at least partially within said first and second surfaces of said rechargeable electrical storage medium housing, respectively.

28. A battery charging apparatus for a cordless radiotelephone having a base station and a rechargeable battery, at least a portion of the base station securing at least a portion of the rechargeable battery, the battery charging system comprising:

a base station housing enclosing an electrical power supply;

a first side of the base station having a indentation disposed therein, said indentation having at least a first surface and a second surface essentially parallel and opposite each other, whereby the rechargeable battery may be removably placed at least partially within said indentation;

first and second conductive battery charging posts disposed on said first surface and said second surface of said indentation essentially along a common axis, respectively;

means for coupling said electrical power supply to said first and second conductive battery charging posts;

means for retracting said first and second conductive protrusions at least partially within said first and second surfaces, respectively, of said indentation;

a rechargeable battery housing enclosing the rechargeable battery and having at least a first and second external surfaces essentially parallel and opposite each other;

first and second recesses disposed on said first surface and said second surface of the rechargeable battery housing, respectively;

first and second conductive contacts disposed within said first and second recesses, respectively;

means for coupling the rechargeable battery to said first and second conductive contacts; and said first and second conductive battery charging posts of said base station housing abutting said first and second conductive battery charging contacts of said rechargeable battery housing, respectively, when the rechargeable battery is removably placed at least partially within said indentation whereby said electrical power supply within the base station may charge the rechargeable battery within said rechargeable battery housing.

29. A charging system comprising:
a) a portable unit including:
1) first and second conductive contacts disposed on the portable unit essentially opposite each other; and
2) rechargeable energy storage means electrically coupled to the first and second conductive contacts; and
b) a base unit including:
1) an indentation formed in the base unit and having a receiving surface shaped to receive at least a portion of the portable unit;
2) first and second conductive protrusions extending outwardly beyond the receiving surface essentially opposite each other; and
3) energy source means electrically coupled to the first and second conductive protrusions wherein the first and second conductive protrusions contact the first and second conductive contacts, respectively, when at least a portion of the portable unit is placed in the indentation.

30. A charging system in accordance with claim 29 wherein the base unit is angularly disposed to a horizontal plane, the charging apparatus further comprising means for holding the portable unit in the indentation.

31. A charging system in accordance with claim 30 wherein the means for holding further comprises means for urging the first and second conductive protrusions beyond the receiving surface.

32. A charging system in accordance with claim 30 wherein the means for holding further comprises first and second recesses disposed on the portable unit and having the first and second conductive protrusions, respectively, disposed therein.

* * * * *